INVENTOR.
RALPH W. YOCUM

United States Patent Office 3,451,121
Patented June 24, 1969

3,451,121
METHOD OF INERTIA WELDING WHEREIN AN INCREASED AXIAL FORCE IS APPLIED IMMEDIATELY UPON ROTATION STOPPAGE
Ralph W. Yocum, Peoria, Ill., assignor to Caterpillar Tractor Co., Peoria, Ill., a corporation of California
Filed Aug. 23, 1965, Ser. No. 481,711
Int. Cl. B23k 27/00
U.S. Cl. 29—470.3          1 Claim

ABSTRACT OF THE DISCLOSURE

This disclosure relates to an improved method of inertia welding wherein an increased axial force is applied immediately after rotation has stopped to bulge out the sharp angle produced between the flash and the welded parts and thereby reduce the tendency of the flash to act as a notch-type stress raiser.

---

This invention relates to a method of bonding metal parts by engaging ends of the parts in rotational rubbing contact. The energy needed to form the bond is stored in rotating inertial weights, and the inertial weights are used to control the process. This invention relates specifically to a technique for eliminating surface configurations which can act as stress raisers in the bonded article.

A bonding process in which metal parts are joined together by pressing the ends of the parts in rotational rubbing contact while the inertial energy stored in a rotating control weight connected to one of the parts is discharged into the bond zone was recently disclosed to the public by the Caterpillar Tractor Co. at the 1965 American Welding Society show in Chicago, Ill. The inertial process produces highly desirable properties in the bond zone due to the quickness of the process and the conditions of plastic working resulting from the use of the inertial weight. In this process, the inertial weight is used to control the process. All of the energy required to form the bond is stored in the inertial weight by bringing the inertial weight up to a selected rotational speed before the parts are engaged. The energy stored in the inertial weight is discharged into the bond zone as heat produced by the friction and plastic working. This inertial process is characterized by high torque produced by the slowing of rotation of the inertial weight, particularly in the last part of the process.

The process parameters—the pressure of engagement, the initial rotational speed and the size and radius of gyration of the inertial weight—are usually selected to produce a small amount of radial flash at the bond zone. Some amount of flash is desirable to insure that the bond has formed across the entire interface between the parts and also to permit some clean up of the bonded article.

The high torque which is characteristic of the inertial process produces an extensive circumferential displacement of the plastic worked material in the bond zone. It also produces a flash configuration which extends generally perpendicular from the outer surface of the bonded article so as to meet the outer surface at an angle which is rather sharply defined. The angular configuration so produced between the flash and the outer surface of the bonded article can act as a notch type stress raiser. This stress raiser in turn can significantly reduce the fatigue life of the bonded article.

The angle or corner between the flash and the outer surface of the bonded article which acts as a stress raiser can be eliminated by machining the flash flush with the outer surface of the bonded article. However, in some cases the bond is produced in a location where the flash cannot be removed. In other cases, it may be difficult to remove the flash without in turn risking machining a notch into the bonded article due to slight misalignment during the bonding operation or during the machining operation.

It is therefore a primary object of the present invention to so utilize the inertial bonding process as to eliminate surface configurations where stress concentrations can form in the bonded article. In the present invention this object is accomplished by increasing the pressure a substantial amount after the rotation of the inertial weight has ended. The increase in pressure at this point in the process pushes the heated material adjacent the flash radially outwardly and changes the corner between the flash and the outer surface of the bonded article to a smoothly curved, fillet-shaped surface. This fillet-shaped surface eliminates any notch type configuration where stress concentrations could form. As a result, the fatigue life of the bonded article is extended to substantially that of the individual parts before being bonded.

The sequence is important. The increased pressure must be applied after the relative rotation has ended. If the pressure is increased while the parts are still being rotated relative to one another, the increased pressure will result only in a greater volume of flash under the influence of the high torque and will not produce the desired fillet type surface between the flash and the outer surface of the bonded article.

Other and further objects of the present invention will be apparent from the following description and claims and are illustrated in the accompanying drawings which, by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appeneded claims.

Figure 4:
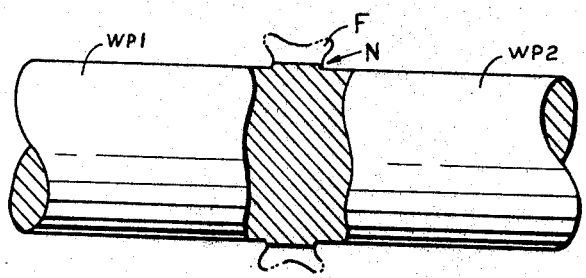
FIG. 4 is an elevation view, in section through the bond zone, showing the flash configuration produced by an inertial bonding process that does not incorporate the step of increasing the pressure at the end of the process.
Figure 5:
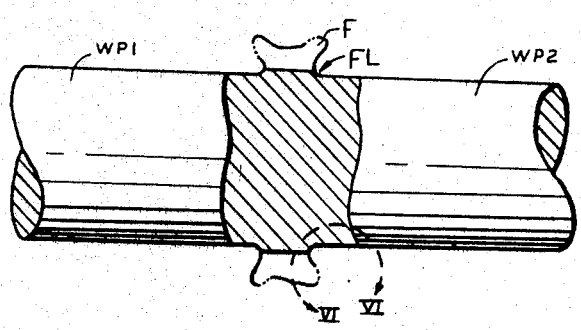
Figure 6:
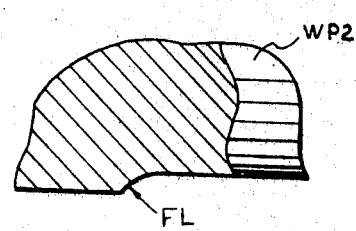

FIG. 5 is an elevation view, in section through the bond zone, of a bonded article produced in accordance with the method of the present invention wherein the pressure is increased after part rotation has ended to produce smoothly curved, fillet-type junctures between the flash and the outer surface of the bonded article rather than the notch-type corners shown in FIG. 4; and FIG. 6 is a fragmentary enlarged view of the area shown encircled by the arrows VI—VI in FIG. 5.

Figure 1:
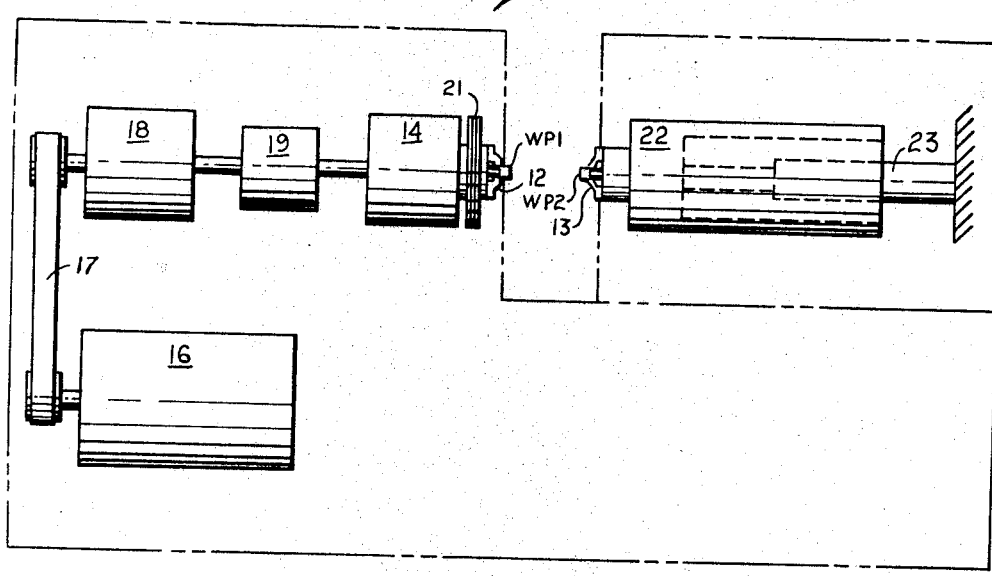
FIG. 1 is a schematic view of one embodiment of a machine which can be used to practice the method of the present invention.

In FIG. 1 one embodiment of a machine which can be used to practice the method of the present invention is shown and is indicated generally by the reference numeral 11. Two workpieces—workpiece WP1 and workpiece WP2— are clamped in chucks 12 and 13 of the machine 11. The chuck 12 is mounted for rotation on a spindle 14. The spindle 14 is rotated by a motor 16 through a belt drive 17, a coupling 18 and clutch 19.

One or more control weights 21 are also mounted for rotation with the spindle 14. The control weights 21 are used as inertial masses to store all of the energy needed to form the bond between the workpieces WP1 and WP2.

Thus, with the clutch 19 engaged, the motor 16 is used to bring the speed of rotation of the control weights 21 to the desired speed. The clutch 19 may then be disengaged to disconnect the spindle 14 and control weights 21 from the drive motor 16. This permits the drive motor to be run at a relatively constant speed during the time that the stored energy is being discharged from the inertial weights during the bonding process.

The coupling 18 is preferably a slip-type coupling, such as a hydraulic coupling, which permits some amount of slip (and less shock to the drive line) when the clutch 19 is again engaged to connect the non-rotating spindle 14 to the rotating motor 16 at the beginning of a new bonding cycle.

The chuck 13 is held against rotation and is mounted for axial movement on a sliding carriage 22. Axial movement of the carriage 22 and the pressure with which the workpieces WP1 and WP2 are engaged during the bonding operation are controlled by a hydraulic ram 23.

In the operation of the machine 11 as thus far described, the workpieces are clamped in the chucks 12 and 13, the fly weights 21 are brought up to the desired speed and the clutch 19 disengages the spindle 14 from the motor 16. Pressurized fluid is then supplied to the ram 23 to move the carriage 22 axially, to the left as viewed in FIG. 1, to bring the workpieces into rotational rubbing contact at a selected pressure. The friction and plastic working produced by the rubbing contact very quickly extract the stored energy from the inertial fly weights 21. The bond is completely formed when the entire amount of the stored energy has been discharged and the rotation of the inertial weights 21 has ended. No brakes or other techniques are needed to stop part rotation and no increase in the axial pressure is needed to form the bond.

For two three-fourths inch diameter steel bars an inertial mass of about 8.2 pound feet squared, an initial rotational speed of about 4,000 r.p.m. and an axial pressure of about 10,000 p.s.i. may be used to bond the workpieces and to produce an acceptable amount of flash for clean-up. Under these conditions, the bond will be produced in a little less than two seconds, as shown by intersection of the speed curve with the time line in FIG. 3.

A bonded article produced with these bonding parameters is shown in FIG. 4. The bond produced has an acceptable amount of flash F (shown in phantom outline) to insure a complete bond across the interface. This flash can readily be removed from the bonded article shown in FIG. 4. As a practical matter, the flash in many instances is machined to a diameter slightly greater than that of the adjacent surfaces to avoid machining a notch into the article due to any misalignment during the bonding operation or the machining operation. In these circumstances, and also in the instances in which the flash is produced in a location which makes subsequent machining difficult or impossible to accomplish, the configuration of the junctures of the flash with outer surface of the bonded article can become important if the bonded article is used in an assembly subjected to fatigue loading.

The high torque produced by the inertial masses 21 causes the flash to extend substantially perpendicular from the outer surface. The flash so produced meets the outer surface at a relatively sharp angle to produce a configuration which can act as a notch type stress raiser as indicated by the reference numeral N.

Thus, while the single pressure inertial bonding process produces a full strength bond (and a bond having a satisfactory amount of flash and the highly desirable short cycle time, preferred material orientation, minimum heat affected zone with extreme grain refinement and beneficial working of the heated material and expulsion of flash resulting from the use of the inertial weights, as demonstrated at the above noted American Welding Society show in Chicago), a notch type surface condition can be left in the completed article; and this notch type surface condition can very seriously reduce the effectiveness of the bonded article if the article is to be used in an environment where it is subjected to fatigue loading.

The present invention is effective to eliminate such a surface condition. In the present invention the pressure is substantially increased just after relative rotation has ended and while some of the material immediately adjacent the flash is still sufficiently heated to be forgeable.

Figure 3:
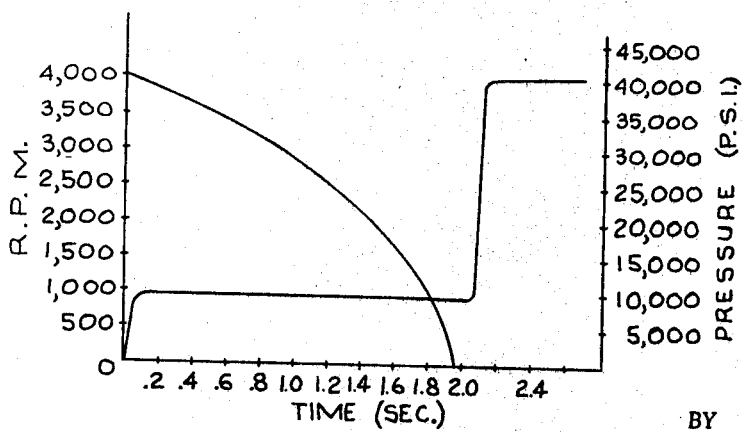
FIG. 3 is a graph showing typical speeds, times and pressures used for bonding steel parts in accordance with the method of the present invention.

As shown in FIG. 3 the axial pressure may be increased by an order of magnitude of about four times immediately after rotation has ceased. This increase in axial pressure displaces the material in the area indicated by the reference numeral N in FIG. 4 from a corner or notch type configuration to a smoothly curved concave fillet as indicated by the reference numeral FL in FIGS. 5 and 6. This fillet-shaped transistion surface between the flash F and the outer surface of the bonded article is a substantially continuously curved, concave surface which has no irregularity or discontinuity where stress concentrations can form.

The sequence of applying the increased pressure is important. If the pressure were to be increased before the part rotation ended, the only result would be a greater volume of flash due to the influence of the torque. The increase of pressure at such a time would therefore not provide the desired result. There would still be a sharp corner between the flash and the outer surface of the workpiece.

The increased pressure must however be applied before the bonded article has cooled to the point where the material at the base of the flash cannot be readily displaced. It has been found that increasing the pressure within about 0.1 second after the relative rotation has ended is quite satisfactory to accomplish the result desired.

Figure 2:
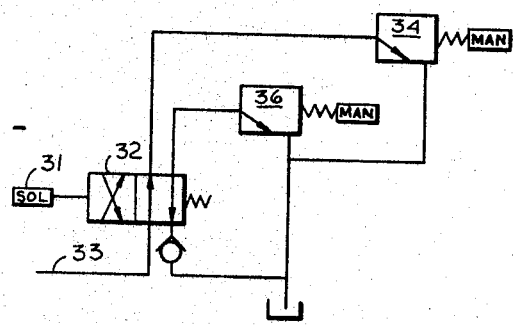
FIG. 2 is a schematic view of a portion of a hydraulic circuit which can be used to apply the increased pressure of the method of the present invention.

In FIG. 2 a portion of a hydraulic circuit which can be used to increase the pressure automatically after the rotation has ended is schematically illustrated. In the circuit shown in FIG. 2 a solenoid 31 is energized by the ending of rotation of the spindle 14 and inertial weights 21 to shift a control valve 32 to the right. This shifts the pump pressure in line 33 from the relief valve 34 (which had limited the pressure in the ram 23 to a value sufficient to create the 10,000 p.s.i. contact pressure shown in FIG. 3) to the manually adjustable relief valve 36. The relief valve 36 can be manually adjusted to establish a fluid pressure sufficient to provide whatever increased contact pressure is desired. In the cycle shown in FIG. 3 the increased contact pressure is about 40,000 p.s.i. The solenoid 31 can be de-energized by a dwell timer, not shown, to return the control valve 32 back to the position shown in FIG. 2 in preparation for the next cycle of operation.

While I have illustrated and described the preferred embodiments of my invention, it is to be understood that these are capable of variation and modification, and I therefore do not wish to be limited to the precise details set forth, but desire to avail myself of such changes and alterations as fall within the purview of the following claims.

I claim:
1. In combination with the method of bonding metal workpieces of the kind wherein the workpieces are pressed together in rotational rubbing contact while inertial energy stored in a rotating inertial mass connected to one workpiece is discharged into the bond zone until the entire stored energy has been discharged as rotation ends, and wherein the relationship of the torque transmitted by the inertial mass to the pressure of engagement produces a radially extending flash which meets the outer surface of each workpiece at an angle sufficiently sharply defined to act as a notch-type stress raiser which can significantly reduce the fatigue life of the bonded part, the improvement of increasing the pressure immediately after rotation has ended by an amount sufficient to eliminate the angle by pushing the heated material adjacent the flash radially outwardly to thereby produce a smoothly curved, fillet-shaped transition surface between the flash and the outer surface of each workpiece which eliminates surface configurations where stress concentrations can form.

References Cited

UNITED STATES PATENTS

| | | | |
|---|---|---|---|
| 3,134,169 | 5/1964 | Hollander et al. | 29—470.3 |
| 3,235,162 | 2/1966 | Hollander | 29—470.3 |
| 3,273,233 | 9/1966 | Oberle et al. | 29—470.3 |

JOHN F. CAMPBELL, *Primary Examiner.*

B. L. ADAMS, *Assistant Examiner.*

U.S. Cl. X.R.

228—2